United States Patent [19]

Porto

[11] Patent Number: 5,790,129

[45] Date of Patent: Aug. 4, 1998

[54] MULTI-MEDIA COMPUTER-BASED METHOD AND DEVICE FOR SELF-IMPROVEMENT BY METAL STIMULATION

[76] Inventor: Jinny K. Porto, 17 Preston St., Huntington, N.Y. 11743

[21] Appl. No.: 955,716

[22] Filed: Oct. 22, 1997

Related U.S. Application Data

[63] Continuation of Ser. No. 492,487, Jun. 20, 1995, abandoned.

[51] Int. Cl.⁶ .................................................. G06T 13/00
[52] U.S. Cl. ........................ 345/302; 345/336; 434/262
[58] Field of Search ................................ 345/302, 336, 345/473, 474; 434/262, 267, 270, 272, 295; 600/300, 425

[56] References Cited

U.S. PATENT DOCUMENTS

| | | | |
|---|---|---|---|
| 4,464,122 | 8/1984 | Fuller et al. | 434/262 |
| 4,712,180 | 12/1987 | Fujiyama et al. | 434/323 |
| 4,863,384 | 9/1989 | Slade | 434/107 |
| 4,905,094 | 2/1990 | Pocock et al. | 386/106 |
| 5,109,482 | 4/1992 | Bohrman | 395/154 |
| 5,217,379 | 6/1993 | Kirschenbaum et al. | 434/236 |
| 5,219,322 | 6/1993 | Weathers | 600/27 |
| 5,221,962 | 6/1993 | Backus et al. | 348/563 |
| 5,253,168 | 10/1993 | Berg | 364/413.01 |
| 5,255,187 | 10/1993 | Sorensen | 364/413.02 |
| 5,274,758 | 12/1993 | Beitel et al. | 395/154 |
| 5,304,112 | 4/1994 | Mrklas et al. | 600/27 |
| 5,310,349 | 5/1994 | Daniels et al. | 434/350 |
| 5,533,903 | 7/1996 | Kennedy | 434/307 R |
| 5,537,141 | 7/1996 | Harper et al. | 348/12 |
| 5,546,943 | 8/1996 | Gould | 128/653.1 |
| 5,577,186 | 11/1996 | Mann, II et al. | 395/806 |

OTHER PUBLICATIONS

Jeanne Achterberg/G. Frank Lawlis (1984) *Imagery and Disease*, published by the Institute for Personality and Ability Testing, Inc.

Ellis (Jun. 1994) *Self Magazine*, pp. 141 and 191.

*Primary Examiner*—Joseph H. Feild
*Assistant Examiner*—Stephen Hong
*Attorney, Agent, or Firm*—Dilworth & Barrese

[57] ABSTRACT

A device and method for use in a multimedia computer for providing self improvement by mental stimulation. The device provides selectable visual imagery and audio presentation to guide the user into mental introspective processes for self improvement.

20 Claims, 4 Drawing Sheets

MULTI-MEDIA COMPUTER-BASED METHOD AND DEVICE FOR SELF-IMPROVEMENT BY METAL STIMULATION

This is a continuation of application Ser. No. 08/492,487 filed on Jun. 20, 1995, now abandoned.

BACKGROUND OF THE INVENTION

1. Technical Field

The present invention relates to a device and method for self improvement by mental stimulation and, more particularly, to a method and device for use in a multi-media computer for presenting audiovisual stimulations.

2. Discussion of Related Art

Essentially any human mind-related tasks, conditions or activities may be properly performed or improved upon by maintaining the proper frame of mind and having the ability to properly focus or concentrate. For example, the results of a student's SAT scores, a basketball player's ability to score on a shot, and a person's mental and even physical well being can be drastically different between one who is in mental control and focussed and another who is not.

The human characteristics of mental focus vs. improved performance are well recognized, especially among performers who must consistently perform under adverse conditions. Many performers adopt individual routines to attain focus. For example, a basketball player takes deep breaths and dribbles the ball several times before shooting a foul shot; a racecar driver gets into his race gear and racecar to visualize and concentrate prior to the start of the race; or a business executive relaxes by meditation prior to an important presentation.

It is also widely believed that the condition of disease progress can be improved upon through psychological and neurophysiological measures, such as by employing mental imagery and visualization. Studies have been made which correlate the status of cancer patients with improvement from practicing mental introspective processes and measures. See "Imagery and Disease", by J. Achterburg and G. F. Lawlis of Institute for Personality and Ability Testing, Inc. in Champaign, Ill.

Therefore, an object of the present invention is a device or method which is usable by a person to interact with the person and to assist the person in the mental imagery and introspective measures.

SUMMARY OF THE INVENTION

The device according to the present invention is usable in a multimedia computer for providing self improvement by mental stimulation, which comprises: a storage medium for storing a database of information about a topic to be self-improved, a plurality of musical programs, and graphical and voice data; voice activation means for causing the computer to present the voice data as narrative voice; graphics means for causing the computer to present the graphical data as a plurality of graphical imagery; selection means for causing the computer to present a menu of the plurality of musical programs and the graphical imagery for selecting one of the plurality of musical programs and graphical imagery; and means for presenting one of the narrative voice and a selected musical program simultaneously with the selected graphical imagery.

The device and method according to the invention facilitates self-improvement by mental stimulation through audiovisual presentations. For example, the physical well being of a person having a disease may be improved through mental conditioning with the presentations.

For such an example, the pathological information specific to a plurality of diseases is stored in the storage medium. The pathological information may be graphically presented, and depending upon user selection, the graphical imagery may be in the form of analogous representations of the selected disease and animations of forces destroying the analogous representation of the selected disease.

In one embodiment of the invention, the device of the invention presents narrative voice simultaneously with the graphical imagery about the pathology of the selected disease, and the selected musical program or sounds of nature is presented simultaneously with the graphical animation of disease destruction.

The storage medium of the invention is preferably a CD ROM. The means for presenting includes a display and a speaker, and the selection means includes a menu of choices presented on the display. A keypad, mouse, or the like may be used for selecting one of the choices from the menu.

The method of self-improvement by mental stimulation according to the present invention comprises the steps of: storing a database of information about a topic to be improved upon, a plurality of musical programs, and a plurality of graphics related to the topic; associating the topic to a corresponding musical program and a corresponding graphics; presenting on a display a menu of the plurality of musical programs and plurality of graphics for selection; accessing information from the database corresponding to a selection; presenting a portion of the accessed information in a narrative voice over a speaker; and simultaneously presenting the musical program and the graphics corresponding to the topic.

The method may further include the step of simultaneously presenting the narrative voice, the musical program and the graphics corresponding to the selected topic.

The method according to the invention is also suitable for self-improvement in athletic abilities. In such method, the plurality of graphics include imagery relating to athletic skills; the accessed information includes the physiological requirements of selected athletic skills; and the step of presenting the athletic skill related graphics includes presenting an animated imagery of the physiological functions in action.

BRIEF DESCRIPTION OF THE DRAWINGS

The features and advantages of the device and method according to the present invention will become apparent to those skilled in the art upon a reading of the following detailed description when taken in conjunction with the drawings of the illustrative embodiments of the invention.

DETAILED DESCRIPTION OF THE PREFERRED EMBODIMENTS OF THE INVENTION

The device and method in accordance with the embodiments of the present invention provides sensory and mental stimulation. The sensory and mental stimulation may be provided in the form of guided imagery, combined with selectable narrative and/or musical presentation. The subject matter of self improvement can be, for example, in improving the conditions of a disease; in controlling the physiological aspects of the body, such as improvement in the performance of an athlete; and in the emotional or psychological well being of a person.

Generally, the device and method according to the present invention improves the well being of a user or a patient through presentation segments of introduction, education, meditation, visualization and closing remarks.

The introduction segment includes, for example, for the case of improving the condition of a disease, an explanation to the patient of the importance of a patient's involvement in all decisions regarding the condition of a disease, and may include an illustration of statistics that support the positive results of an assertive patient.

The education segment includes a brief education for the patient of the pathology of the particular disease and the disease healing process.

The meditation segment is intended to place the patient into a relaxed, receptive state of mind, by utilizing narrative instructions for breathing, relaxing, and meditating techniques. During this segment, the user may also select background or foreground music or other soothing sounds of nature, which may be presented as background to the narration or as foreground musical or audio program.

The visualization segment mentally instills the patient with guided imagery to visualize how a disease can be destroyed. For example, by presenting to the patient animations of means for destroying a disease with an animated super hero killing cancer cells and carrying them out of the body. The types of animation and imagery are also user selectable.

In the closing segment, remarks will be made to encourage the patient to utilize the device and method of the invention several times a day or to otherwise impress upon the memory of the patient to be able to visualize the healing process and encourage the development of the patients own imagery. The remarks may also state the importance of a positive attitude in maintaining control of the disease.

Figure 1:
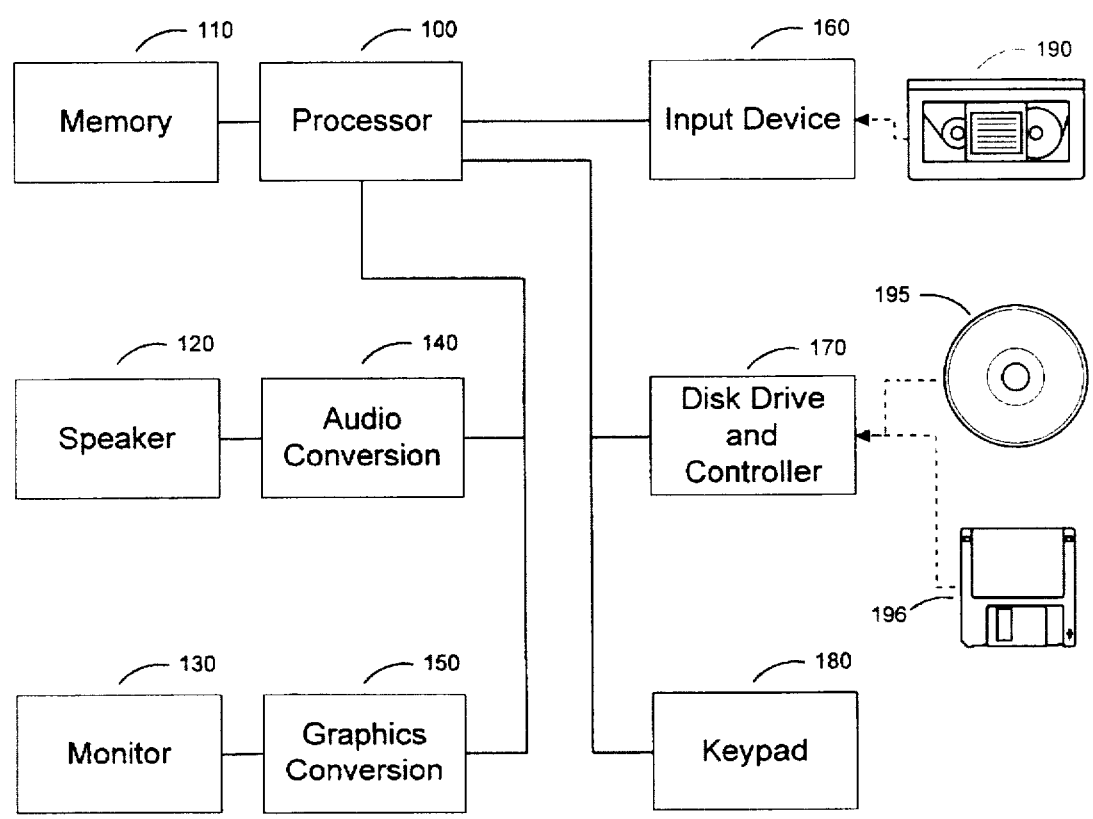
FIG. 1 illustrates the use of the device according to the invention in a computer.

Referring to FIG. 1, the device and method according to the present invention is shown implemented in a storage medium such as a CD ROM 195 or a floppy diskette 196, which includes a stored multi-media program for controlling a multi-media computer. The major components of a multi-media computer is shown in FIG. 1 as a processor 100 having associated memory 110, connected to voice conversion circuitry 140 for driving speakers 120 and graphics conversion circuitry 150 for displaying data or graphics on monitor 130 under control of processor 100, which in turn may be controlled by programs within the CD ROM 195 or floppy diskette 196 through disk drive and controller 170. The keypad 180 provides user interface to the computer such as for selection of self improvement information, disease type, musical selections, and imagery animation selections.

In an alternative form, the presentation means of the invention may be embodied in a video cassette 190 and the presentation material is read by processor 100 through input device 160, which may include analog to digital conversion circuitry for digitizing the information from the video cassette 190 for facilitating data transfer and control with the processor 100.

Figure 2:
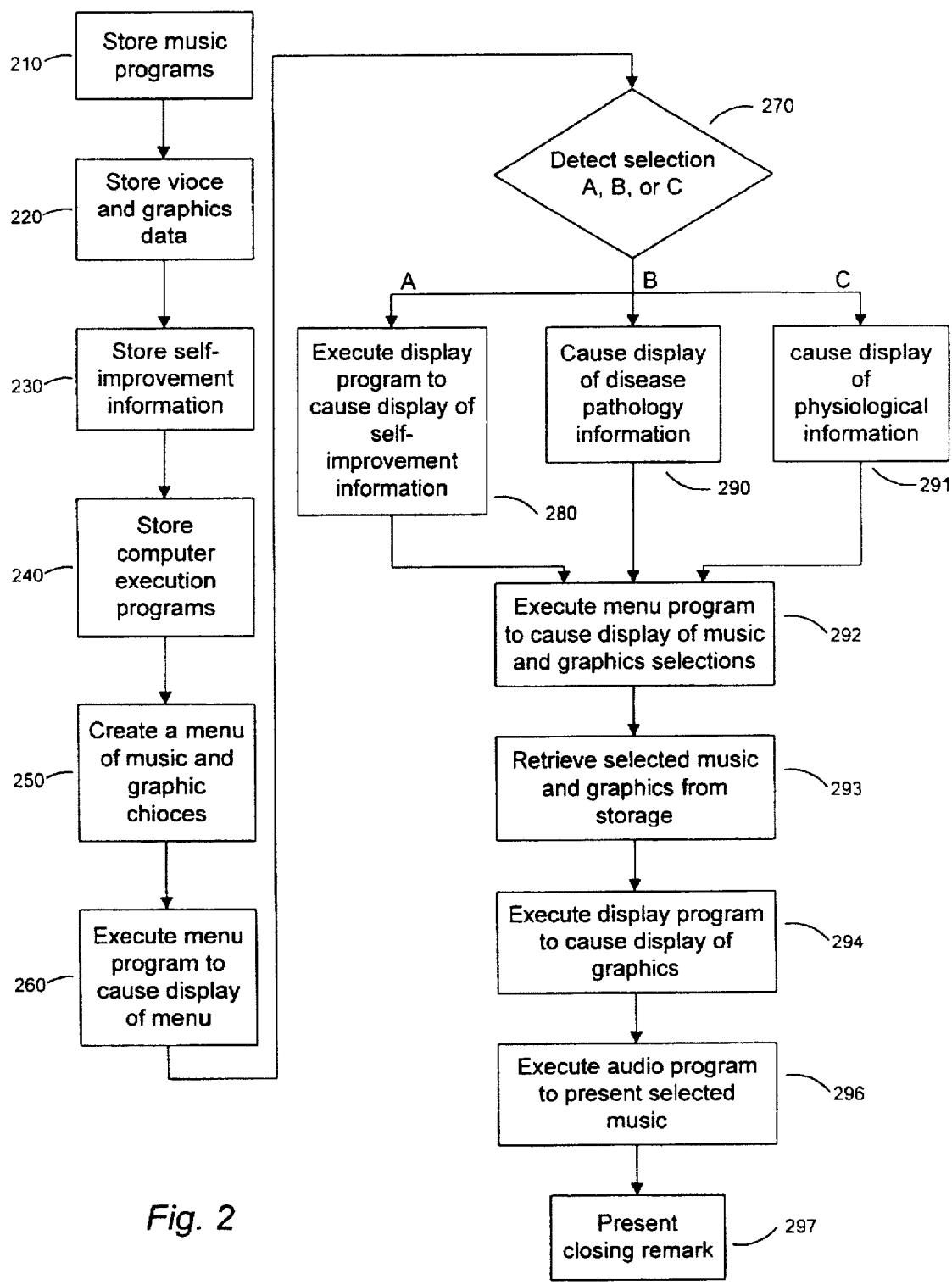
FIG. 2 is an illustrative flow chart representation of the usage of the device according to the present invention in a computer.

FIG. 2 illustrates an interactive process between the device and method of the present invention embodied in the storage medium, the multi-media computer, and the user. The storage medium stores a selection of musical programs (Step 210), a collection of graphical imagery or animations, some of which have been grouped for display in a sequence for purposes of guiding the user through a sequence of imagery, and narrative voice, previously converted to digital data for storage in the storage medium (Step 220). Also stored in the storage medium is the self-improvement information which may be presented in the introduction or education segments of the presentation. Software program codes for causing processor 100 to perform processing and control functions are also installed in the storage medium. The processing and control functions include the coordination and transfer of data stored in the storage medium, coordinate the conversion of audio and graphical data for presentation over the speakers and the monitor, and process selection commands from the user (Step 240).

The interaction of the user with the device of the invention includes the presentation of a menu on the monitor for the user to select a self improvement subject matter, musical selection, animation selection, and selection to bypass certain segments of the presentation (Steps 250 and 260). Upon detection in step 270 of the selection of the choices by the user the processor 100, in conjunction with the storage medium 195 or 196, detects the selected choice and executes the selected portions of the program codes to cause a display of, for example, self-improvement information (Step 280), disease pathology information (Step 290), or physiological information (Step 295). The control program in the storage medium then causes the processor 100 to retrieve the musical and graphical information selected by the user from the storage medium and present the information over the speakers 120 and monitor 130 in accordance with the user selections (Steps 292–295). Upon completion of the musical and graphical presentation, closing remarks are presented to the user to encourage the user to develop her own visualization by mentally recalling the imagery repeated from the presentation. For a repeated user, the user may choose to bypass certain segments, such as the self-improvement information or the education segment, to other segments of the program. Listed in the Appendix is a representative portion of the program codes stored in the storage medium which can be used to implement the exemplary process as shown in FIG. 2.

Figure 3A:
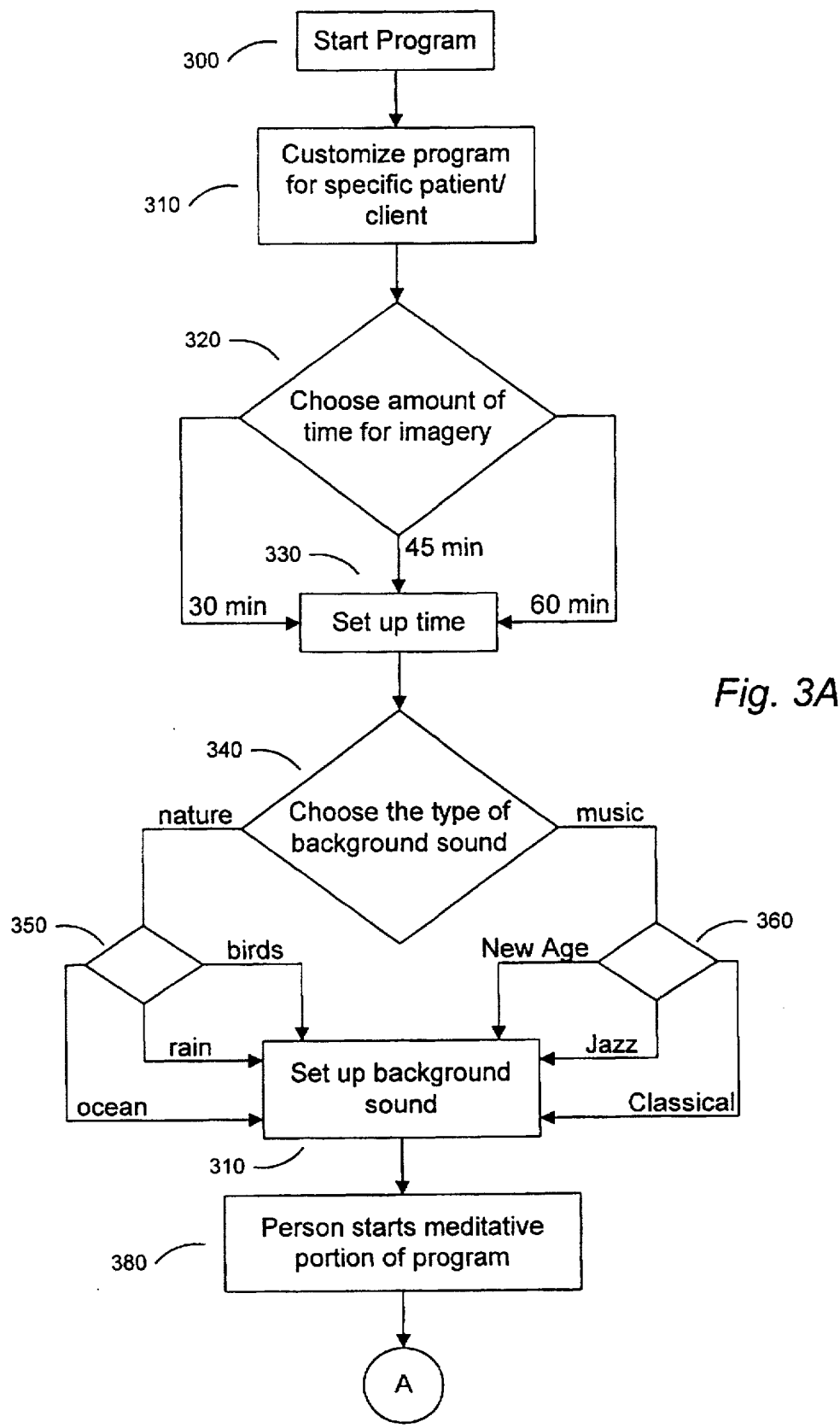
FIGS. 3A and 3B show another illustrative flow chart of the operation of the device according to the present invention; and the Appendix shows a listing of a representative portion of the program codes for implementing the present invention.
Figure 3B:
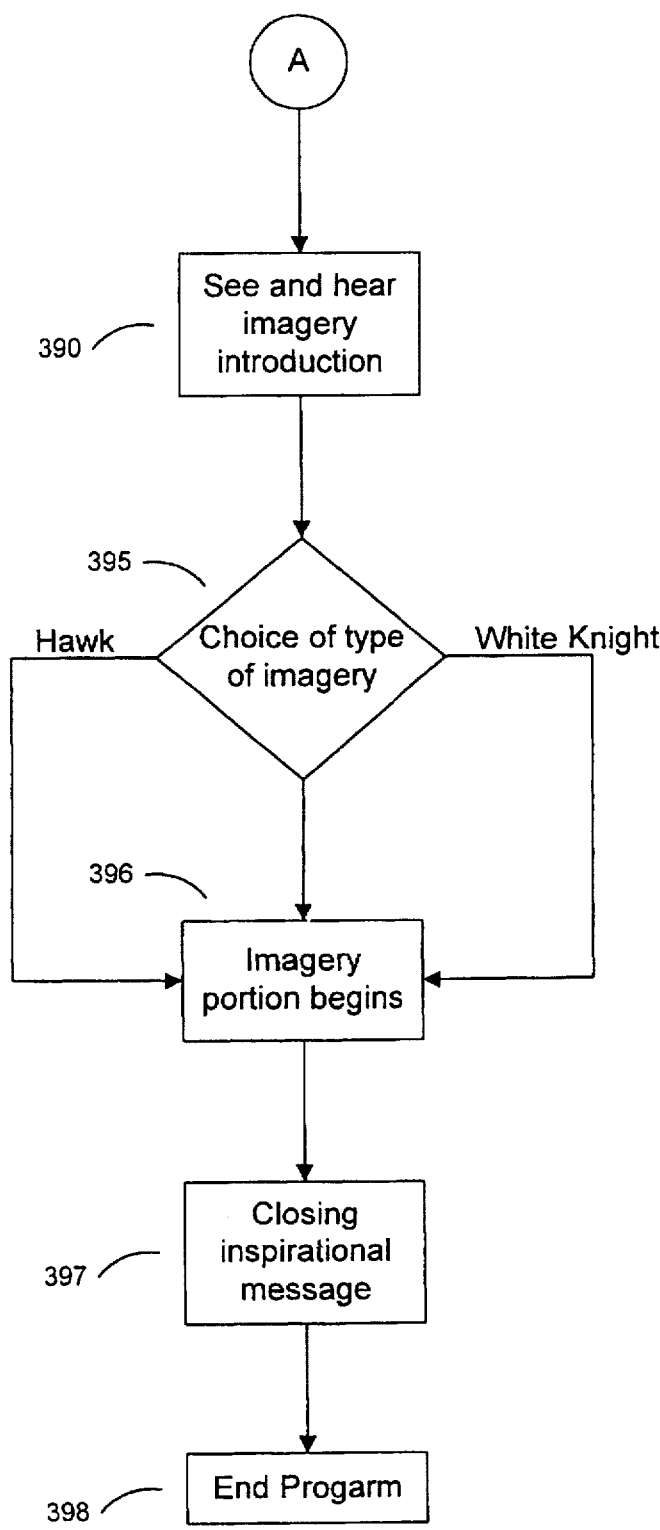

FIGS. 3A and 3B illustrate the interactive nature of the usage of the device and method according to the present invention. The information stored in the storage medium may be customized to be application specific. For example, the information may be customized for use by a doctor for a patient for usage as a supplemental program for a specific disease. In such an application, the stored information will include introductory and educational information specific to the disease, e.g., the introductory segment may include encouraging statistics on recovery from such a disease and the treatments available for the disease. The education segment may include the pathology of the disease process and how mental or medical treatment may be used to destroy the disease.

If the object is to improve athletic skills, the device of the invention may be customized to include an introductory segment having information or statistics which support positive results derived from a positive attitude, a clear state of mind, and improved results from an enhanced ability to concentrate (Step 310).

A menu having different time durations is then presented. The user chooses the duration of the visualization section (Steps 320 and 330), which may be 30, 45 or 60 minutes.

The selection may be by entering numbers corresponding to a presentation menu on monitor 130. The entries are made on keypad 180.

The user then selects from the menu the type of musical program to be played as background for the session. The audio program may include music, sounds of nature such as the sounds of oceans waves or bird calls, and musical programs such as new age or classical music (Steps 340–370).

Upon presentation of the background sound over the speakers 120, the user enters the meditative segment of the program (Step 380), in which the user is presented with narrative, voice-over music or natural sounds to guide the user into a meditative state. The narrative may include instructions for breathing or relaxing in a certain position (Step 390). The education segment may also be presented as voice over music. Simultaneously, the stored program may cause the monitor to display statistics relating to the chosen topic. Or, for a disease, a graphical educational program of how the disease can be destroyed by drugs.

The user proceeds to choose the type of animation or imagery sequence to be presented (Step 395). For example, the user may choose an animation of a destructive source such as a white knight or a tank destroying analogous representations of the disease, or a hawk flying off with the cancerous cells (Step 396). The program then ends with an inspirational closing remark to encourage the patient to repeat the sessions, to mentally repeat the visualizations or to develop her own imagery. The remarks should also state the importance of being in control of the patient's own mental state and to keep a positive attitude (Step 397).

In an alternative embodiment, the information stored in CD ROM 195 or floppy diskette 196 of FIG. 1 may also be stored in video cassette 190. The input device 160 includes conversion circuitry for converting the video information for processing by processor 100.

It will be understood that various modifications can be made to the various embodiments of the present invention herein disclosed without departing from the spirit and scope thereof. Those skilled in the art will envision other modifications within the scope and spirit of the present invention as defined by the claims appended hereto.

APPENDIX doctor01.mak

[P1]

```
PROJ = DOCTOR01
DEBUG = 1
PROGTYPE = 0
CALLER =
ARGS =
DLLS =
D_RCDEFINES = /d_DEBUG
R_RCDEFINES = /dNDEBUG
ORIGIN = MSVC
ORIGIN_VER = 1.00
PROJPATH = C:\FILES\MEDICAL\DOCTOR01\
USEMFC = 1
CC = cl
CPP = cl
CXX = cl
CCREATEPCHFLAG =
CPPCREATEPCHFLAG = /YcSTDAFX.H
CUSEPCHFLAG =
CPPUSEPCHFLAG = /YuSTDAFX.H
FIRSTC =
FIRSTCPP = STDAFX.CPP
RC = rc
CFLAGS_D_WEXE = /nologo /G2 /W3 /Zi /AM /Od /D "_DEBUG" /FR /GA
 /Fd"DOCTOR01.PDB"
CFLAGS_R_WEXE = /nologo /Gs /G2 /W3 /AM /O1 /D "NDEBUG" /FR /GA
LFLAGS_D_WEXE = /NOLOGO /NOD /PACKC:61440 /STACK:10240 /ALIGN:16
 /ONERROR:NOEXE /CO
LFLAGS_R_WEXE = /NOLOGO /NOD /PACKC:61440 /STACK:10240 /ALIGN:16
 /ONERROR:NOEXE
LIBS_D_WEXE = mafxcwd oldnames libw mlibcew commdlg olesvr olecli shell
LIBS_R_WEXE = mafxcw oldnames libw mlibcew commdlg olesvr olecli shell
RCFLAGS = /nologo /z
RESFLAGS = /nologo /t
RUNFLAGS =
DEFFILE = DOCTOR01.DEF
OBJS_EXT =
LIBS_EXT =
!if "$(DEBUG)" == "1"
CFLAGS = $(CFLAGS_D_WEXE)
LFLAGS = $(LFLAGS_D_WEXE)
LIBS = $(LIBS_D_WEXE)
MAPFILE = nul
RCDEFINES = $(D_RCDEFINES)
!else
CFLAGS = $(CFLAGS_R_WEXE)
```

*doctor01.mak*

```
LFLAGS = $(LFLAGS_R_WEXE)
LIBS = $(LIBS_R_WEXE)
MAPFILE = nul
RCDEFINES = $(R_RCDEFINES)
!endif
!if [if exist MSVC.BND del MSVC.BND]
!endif
SBRS = STDAFX.SBR \
            DOCTOR01.SBR \
            MAINFRM.SBR \
            DOCTODOC.SBR \
            DOCTVW.SBR DOCTOR01_RCDEP = c:\files\medical\doctor01\res\doctor01.ico \
        c:\files\medical\doctor01\res\doctodoc.ico \
        c:\files\medical\doctor01\res\toolbar.bmp \
        c:\files\medical\doctor01\res\doctor01.rc2

STDAFX_DEP = c:\files\medical\doctor01\stdafx.h

DOCTOR01_DEP = c:\files\medical\doctor01\stdafx.h \
        c:\files\medical\doctor01\doctor01.h \
        c:\files\medical\doctor01\mainfrm.h \
        c:\files\medical\doctor01\doctodoc.h \
        c:\files\medical\doctor01\doctvw.h MAINFRM_DEP = c:\files\medical\doctor01\stdafx.h \
        c:\files\medical\doctor01\doctor01.h \
        c:\files\medical\doctor01\mainfrm.h DOCTODOC_DEP = c:\files\medical\doctor01\stdafx.h \
        c:\files\medical\doctor01\doctor01.h \
        c:\files\medical\doctor01\doctodoc.h DOCTVW_DEP = c:\files\medical\doctor01\stdafx.h \
        c:\files\medical\doctor01\doctor01.h \
        c:\files\medical\doctor01\doctodoc.h \
        c:\files\medical\doctor01\doctvw.h
``` doctorol.nk

```
all:    $(PROJ).EXE $(PROJ).BSC

DOCTOR01.RES:   DOCTOR01.RC $(DOCTOR01_RCDEP)
        $(RC) $(RCFLAGS) $(RCDEFINES) -r DOCTOR01.RC

STDAFX.OBJ:     STDAFX.CPP $(STDAFX_DEP)
        $(CPP) $(CFLAGS) $(CPPCREATEPCHFLAG) /c STDAFX.CPP

DOCTOR01.OBJ:   DOCTOR01.CPP $(DOCTOR01_DEP)
        $(CPP) $(CFLAGS) $(CPPUSEPCHFLAG) /c DOCTOR01.CPP

MAINFRM.OBJ:    MAINFRM.CPP $(MAINFRM_DEP)
        $(CPP) $(CFLAGS) $(CPPUSEPCHFLAG) /c MAINFRM.CPP

DOCTODOC.OBJ:   DOCTODOC.CPP $(DOCTODOC_DEP)
        $(CPP) $(CFLAGS) $(CPPUSEPCHFLAG) /c DOCTODOC.CPP

DOCTVW.OBJ:     DOCTVW.CPP $(DOCTVW_DEP)
        $(CPP) $(CFLAGS) $(CPPUSEPCHFLAG) /c DOCTVW.CPP $(PROJ).EXE::   DOCTOR01.RES $(PROJ).EXE:    STDAFX.OBJ DOCTOR01.OBJ MAINFRM.OBJ DOCTODOC.OBJ
DOCTVW.OBJ $(OBJS_EXT) $(DEFFILE)
        echo >NUL @<<$(PROJ).CRF
STDAFX.OBJ -
DOCTOR01.OBJ +
MAINFRM.OBJ +
DOCTODOC.OBJ +
DOCTVW.OBJ +
$(OBJS_EXT)
$(PROJ).EXE
$(MAPFILE)
c:\msvc\lib\+
c:\msvc\mfc\lib\+
$(LIBS)
$(DEFFILE);
<<
        link $(LFLAGS) @$(PROJ).CRF
        $(RC) $(RESFLAGS) DOCTOR01.RES $@
        @copy $(PROJ).CRF MSVC.BND $(PROJ).EXE :   DOCTOR01.RES
        if not exist MSVC.BND   $(RC) $(RESFLAGS) DOCTOR01.RES $@
``` doctor01.mak

```
run: $(PROJ).EXE
        $(PROJ) $(RUNFLAGS)

$(PROJ).BSC: $(SBRS)
        bscmake @<<
/o$@ $(SBRS)
<<
```

```
// doctor01.cpp : Defines the class behaviors for the application.
// include "stdafx.h"
include "doctor01.h"

#include "mainfrm.h"
#include "doctodoc.h"
#include "doctvw.h"

#ifdef _DEBUG
#undef THIS_FILE
static char BASED_CODE THIS_FILE[] = __FILE__;
endif /////////////////////////////////////////////////////////////
// CDoctor01App BEGIN_MESSAGE_MAP(CDoctor01App, CWinApp)
    //{{AFX_MSG_MAP(CDoctor01App)
    ON_COMMAND(ID_APP_ABOUT, OnAppAbout)
    ON_COMMAND(ID_IMAGERY_CHANGESOUND_CLASSICAL,
OnImageryChangesoundClassical)
    ON_COMMAND(ID_IMAGERY_CHANGESOUND_NATURE,
OnImageryChangesoundNature)
    ON_COMMAND(ID_IMAGERY_CHANGETIME_30MIN,
OnImageryChangetime30min)
    ON_COMMAND(ID_IMAGERY_CHANGETIME_45MIN,
OnImageryChangetime45min)
    ON_COMMAND(ID_IMAGERY_CHANGETIME_60MIN,
OnImageryChangetime60min)
    ON_COMMAND(ID_IMAGERY_RUN_IMAGERY, OnImageryRunImagery)
    ON_UPDATE_COMMAND_UI(ID_IMAGERY_CHANGESOUND_CLASSICAL,
OnUpdateImageryChangesoundClassical)
    ON_UPDATE_COMMAND_UI(ID_IMAGERY_CHANGESOUND_NATURE,
OnUpdateImageryChangesoundNature)
    ON_UPDATE_COMMAND_UI(ID_IMAGERY_CHANGETIME_30MIN,
OnUpdateImageryChangetime30min)
    ON_UPDATE_COMMAND_UI(ID_IMAGERY_CHANGETIME_45MIN,
OnUpdateImageryChangetime45min)
    ON_UPDATE_COMMAND_UI(ID_IMAGERY_CHANGETIME_60MIN,
OnUpdateImageryChangetime60min)
    ON_UPDATE_COMMAND_UI(ID_IMAGERY_RUN_IMAGERY,
OnUpdateImageryRunImagery)
    ON_COMMAND(ID_EDIT_QUESTIONS, OnEditQuestions)
```

Doctor01.cpp

```
        ON_UPDATE_COMMAND_UI(ID_EDIT_QUESTIONS, OnUpdateEditQuestions)
    //}}AFX_MSG_MAP
    // Standard file based document commands
    ON_COMMAND(ID_FILE_NEW, CWinApp::OnFileNew)
    ON_COMMAND(ID_FILE_OPEN, CWinApp::OnFileOpen)
    // Standard print setup command
    ON_COMMAND(ID_FILE_PRINT_SETUP, CWinApp::OnFilePrintSetup)
END_MESSAGE_MAP()

/////////////////////////////////////////////////////////////////////////////
// CDoctor01App construction CDoctor01App::CDoctor01App()
{
    // TODO: add construction code here,
    // Place all significant initialization in InitInstance
}

/////////////////////////////////////////////////////////////////////////////
// The one and only CDoctor01App object CDoctor01App NEAR theApp;

/////////////////////////////////////////////////////////////////////////////
// CDoctor01App initialization BOOL CDoctor01App::InitInstance()
{
    // Standard initialization
    // If you are not using these features and wish to reduce the size
    // of your final executable, you should remove from the following
    // the specific initialization routines you do not need.

SetDialogBkColor();        // set dialog background color to gray
    LoadStdProfileSettings();  // Load standard INI file options (including MRU)

// Register the application's document templates.  Document templates
    // serve as the connection between documents, frame windows and views.

AddDocTemplate(new CMultiDocTemplate(IDR_DOCTORTYPE,
            RUNTIME_CLASS(CDoctor01Doc),
            RUNTIME_CLASS(CMDIChildWnd),      // standard MDI child frame
            RUNTIME_CLASS(CDoctor01View)));

// create main MDI Frame window
``` doctor01.cpp

```
        CMainFrame* pMainFrame = new CMainFrame;
        if (!pMainFrame->LoadFrame(IDR_MAINFRAME))
                return FALSE;
        pMainFrame->ShowWindow(m_nCmdShow);
        pMainFrame->UpdateWindow();
        m_pMainWnd = pMainFrame;

// enable file manager drag/drop and DDE Execute open
        m_pMainWnd->DragAcceptFiles();
        EnableShellOpen();
        RegisterShellFileTypes();

// simple command line parsing
        if (m_lpCmdLine[0] == '\0')
        {
                // create a new (empty) document
                OnFileNew();
        }
        else if ((m_lpCmdLine[0] == '-' || m_lpCmdLine[0] == '/') &&
                (m_lpCmdLine[1] == 'e' || m_lpCmdLine[1] == 'E'))
        {
                // program launched embedded - wait for DDE or OLE open
        }
        else
        {
                // open an existing document
                OpenDocumentFile(m_lpCmdLine);
        } return TRUE;
}

/////////////////////////////////////////////////////////////
// CAboutDlg dialog used for App About class CAboutDlg : public CDialog
{
public:
        CAboutDlg();

// Dialog Data
        //{{AFX_DATA(CAboutDlg)
        enum { IDD = IDD_ABOUTBOX };
        //}}AFX_DATA
```

CDoctor01.cpp

```cpp
// Implementation
protected:
    virtual void DoDataExchange(CDataExchange* pDX);    // DDX/DDV support
    //{{AFX_MSG(CAboutDlg)
        // No message handlers
    //}}AFX_MSG
    DECLARE_MESSAGE_MAP()
};

CAboutDlg::CAboutDlg() : CDialog(CAboutDlg::IDD)
{
    //{{AFX_DATA_INIT(CAboutDlg)
    //}}AFX_DATA_INIT
} void CAboutDlg::DoDataExchange(CDataExchange* pDX)
{
    CDialog::DoDataExchange(pDX);
    //{{AFX_DATA_MAP(CAboutDlg)
    //}}AFX_DATA_MAP
}

BEGIN_MESSAGE_MAP(CAboutDlg, CDialog)
    //{{AFX_MSG_MAP(CAboutDlg)
        // No message handlers
    //}}AFX_MSG_MAP
END_MESSAGE_MAP()

// App command to run the dialog
void CDoctor01App::OnAppAbout()
{
    CAboutDlg aboutDlg;
    aboutDlg.DoModal();
}

/////////////////////////////////////////////////////////
// CDoctor01App commands void CDoctor01App::OnImageryChangesoundClassical()
{
    // TODO: Add your command handler code here

} void CDoctor01App::OnImageryChangesoundNature()
``` doctor01.cpp [p5]

```cpp
{
        // TODO: Add your command handler code here
} void CDoctor01App::OnImageryChangetime30min()
{
        // TODO: Add your command handler code here
} void CDoctor01App::OnImageryChangetime45min()
{
        // TODO: Add your command handler code here
} void CDoctor01App::OnImageryChangetime60min()
{
        // TODO: Add your command handler code here
} void CDoctor01App::OnImageryRunImagery()
{
        // TODO: Add your command handler code here
} void CDoctor01App::OnUpdateImageryChangesoundClassical(CCmdUI* pCmdUI)
{
        // TODO: Add your command update UI handler code here
} void CDoctor01App::OnUpdateImageryChangesoundNature(CCmdUI* pCmdUI)
{
        // TODO: Add your command update UI handler code here
} void CDoctor01App::OnUpdateImageryChangetime30min(CCmdUI* pCmdUI)
{
        // TODO: Add your command update UI handler code here
``` doctor01.cpp

```cpp
} void CDoctor01App::OnUpdateImageryChangetime45min(CCmdUI* pCmdUI)
{
    // TODO: Add your command update UI handler code here
} void CDoctor01App::OnUpdateImageryChangetime60min(CCmdUI* pCmdUI)
{
    // TODO: Add your command update UI handler code here
} void CDoctor01App::OnUpdateImageryRunImagery(CCmdUI* pCmdUI)
{
    // TODO: Add your command update UI handler code here
} void CDoctor01App::OnEditQuestions()
{
    // TODO: Add your command handler code here
} void CDoctor01App::OnUpdateEditQuestions(CCmdUI* pCmdUI)
{
    // TODO: Add your command update UI handler code here
}
```

What is claimed is:

1. A device for use in a multimedia computer for providing self improvement by mental stimulation, comprising:

storage means for storing a database of information about a plurality of user-selectable topics to be self-improved, a plurality of musical programs and a plurality of graphical and voice data wherein said topic to be self-improved is a condition of a disease and wherein each of the plurality of musical programs and each of the plurality of graphical and voice data corresponds to at least one of the user-selectable topics;

voice means for causing said computer to present said voice data corresponding to a user-selected topic as narrative voice;

graphic means for causing said computer to present said graphical data corresponding to the user-selected topic as a plurality of graphical imagery;

selection means for receiving a user input selecting one of the plurality of user-selectable topics as the user-selected topic and for causing said computer to present a menu of musical programs corresponding to the user-selected topic and said graphical imagery corresponding to the user-selected topic for selecting one of said musical programs and graphical imagery for use in conjunction with the user-selected topic; and means for presenting, in conjunction with the user-selected topic, one of said narrative voice and a selected musical program simultaneously with said selected graphical imagery.

2. The device according to claim 1, wherein said database of information includes pathological information specific to a plurality of diseases.

3. The device according to claim 2, wherein said plurality of graphical imagery correspond to respective ones of said disease includes an analogous representation of said selected disease and an animation of a force destroying said analogous representation of said selected disease.

4. The device according to claim 2, wherein said plurality of graphical imagery corresponding to respective ones of said diseases includes a plurality of selectable animations for further selection from said selection means.

5. The device according to claim 2, wherein said graphic imagery corresponding to a selected disease includes the pathology of said disease; and said graphical imagery corresponding to said selected disease includes an analogous representation of said selected disease and an animation of a force destroying said analogous representation of said selected disease.

6. The device according to claim 5, wherein said narrative voice is presented simultaneously with said graphical imagery about the pathology of said disease and said selected musical program is presented simultaneously with said graphical imagery about said animation of said disease destruction.

7. The device according to claim 1, wherein said means for presenting simultaneously presents said narrative voice, said selected musical program and said graphical imagery.

8. The device according to claim 1, wherein said storage means is a CD ROM.

9. The device according to claim 1, wherein said means for presenting includes a display and a speaker.

10. The device according to claim 9, wherein said selection means includes a menu of choices presented on said display and a keypad for selecting one of said choices from said menu.

11. The device of claim 1 wherein:

the storage means stores the database of information about the plurality of user-selectable topics, including topics selectable from the group including self-improvement, disease pathology, and physiology; and the selection means receives the user input for selecting one of the plurality of user-selectable topics, including self-improvement, disease pathology, and physiology.

12. A method of self-improvement by mental stimulation, comprising the steps of:

storing a database of information about a plurality of user-selectable topics to be improved upon, a plurality of musical programs and a plurality of graphics wherein each of the plurality of musical programs and each of the plurality of graphics corresponds to at least one of the user-selectable topics;

associating each of the plurality of user-selectable topics with a corresponding musical program and a corresponding graphics;

presenting on a display menu of the plurality of user-selectable topics for selection by the user;

receiving user inputs to select one of the plurality of user-selectable topics as a user-selected topic;

presenting on a display a menu of said plurality of musical programs corresponding to the user-selected topic and plurality of graphics corresponding to the user-selected topic for selection;

accessing information from said database corresponding to a selection of the plurality of musical programs corresponding to the user-selected topic and plurality of graphics corresponding to the user-selected topic;

presenting a portion of said accessed information in a narrative voice over a speaker; and simultaneously presenting said musical program and said graphics corresponding to said user-selected topic said topic to be improved is one from a group consisting of the pathology of diseases and self-improvement in athletic abilities.

13. The method according to claim 12, further including the step of simultaneously presenting said narrative voice, said musical program and said graphics corresponding to said selected topic.

14. The method according to claim 12, wherein said plurality of graphics include imagery ralating to athletic skills.

15. The method according to claim 14, further including the step of presenting a portion of said accessed information representing the physiological requirements of selected athletic skills.

16. The method according to claim 14, wherein said step of presenting said athletic skill related graphics includes presenting an animated imagery of a selected athletic skills.

17. The method according to claim 16, wherein said step of simultaneously presenting further includes presenting on a display a menu of a plurality of animations for selection.

18. A method of self-improvement by mental stimulation, comprising the steps of:

storing a database of information about a plurality of user-selectable diseases including the pathology of each disease, and a plurality of audio programs and disease-related imagery including animations of disease destruction processes wherein each of the plurality of audio programs and disease-related imagery corresponds to one of the user-selectable diseases;

presenting for selection a menu of the plurality of user-selectable diseases;

receiving a user input selecting one of the plurality of user-selectable disease as a user-selected disease;

presenting for selection a menu of audio programs and disease-related imagery corresponding to the user-selected disease;

accessing information from said database corresponding to user-selected disease;

accessing a selected audio program and a selected imagery corresponding to the user-selected disease; and simultaneously presenting said selected information including the pathology of said user-selected disease,
said selected audio program and said selected imagery including an animation of a disease destruction process.

19. The method according to claim 18, wherein said step of simultaneously presenting includes a voice-over-music presentation of said selected audio program.

20. The method according to claim 18, wherein said step of simultaneously presenting said pathology information includes presenting a narrative voice over a speaker and presenting pathology graphics on a display.

* * * * *

UNITED STATES PATENT AND TRADEMARK OFFICE
CERTIFICATE OF CORRECTION

PATENT NO : 5,790,129
DATED : August 4, 1998
INVENTOR(S): Jinny K. Porto

It is certified that error appears in the above-identified patent and that said Letters Patent is hereby corrected as shown below:

On the title page, item [54], and column 1, the title should read

-- MULTI-MEDIA COMPUTER-BASED METHOD AND DEVICE FOR SELF-IMPROVEMENT BY <u>MENTAL</u> [METAL] STIMULATION --.

Signed and Sealed this

Twenty-ninth Day of December, 1998

Attest:

Attesting Officer

BRUCE LEHMAN

*Commissioner of Patents and Trademarks*